(12) United States Patent
Kufner et al.

(10) Patent No.: US 7,480,427 B2
(45) Date of Patent: Jan. 20, 2009

(54) ELECTRONIC DEVICE AND ARRANGEMENT FOR PROVIDING COMMUNICATION BETWEEN BODY PARTS THEREOF

(75) Inventors: Stefan Kufner, Hesse (DE); Mark W. Oliver, Mundelein, IL (US); Aroon V. Tungare, Winfield, IL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 11/761,692

(22) Filed: Jun. 12, 2007

(65) Prior Publication Data

US 2008/0310794 A1  Dec. 18, 2008

(51) Int. Cl.
*G02B 6/26* (2006.01)
*G02B 6/42* (2006.01)
(52) U.S. Cl. .............................. 385/25; 385/15; 385/19; 385/26
(58) Field of Classification Search .................. None
See application file for complete search history.

(56) References Cited

U.S. PATENT DOCUMENTS

| 5,069,461 | A |  | 12/1991 | Orlowski |
| 5,125,054 | A |  | 6/1992 | Ackley et al. |
| 5,917,966 | A | * | 6/1999 | Beuhler et al. ................. 385/15 |
| 6,470,132 | B1 | * | 10/2002 | Nousiainen et al. ......... 385/146 |
| 7,184,617 | B2 | * | 2/2007 | Korenaga et al. ............. 385/14 |
| 7,194,154 | B2 | * | 3/2007 | Hyatt .......................... 385/25 |
| 7,338,193 | B1 | * | 3/2008 | Zeiger et al. ................ 362/551 |
| 2004/0223689 | A1 |  | 11/2004 | Lempkowski et al. |
| 2005/0129407 | A1 |  | 6/2005 | Coleman |

OTHER PUBLICATIONS

J. Bahr, "Tolerant Coupling Of Integrated Multimode Waveguides," Lasers and Electro-Optics Society 2000 Annual Meeting. LEOS 2000. 13th Annual Meeting. IEEE, Nov. 13-16, 2000, vol. 2, pp. 571-572.

* cited by examiner

*Primary Examiner*—Sung H Pak
*Assistant Examiner*—Chad H Smith

(57) ABSTRACT

An electronic device comprises an arrangement for providing communication between a first body part and a second body part of the electronic device. The first body part and second body part are moveable relative to one another; each body part comprising a contact surface, the contact surfaces being located generally adjacent one another. At least one contact surface comprises an optical light guide component arranged to provide communication between the first body part and second body part.

20 Claims, 15 Drawing Sheets

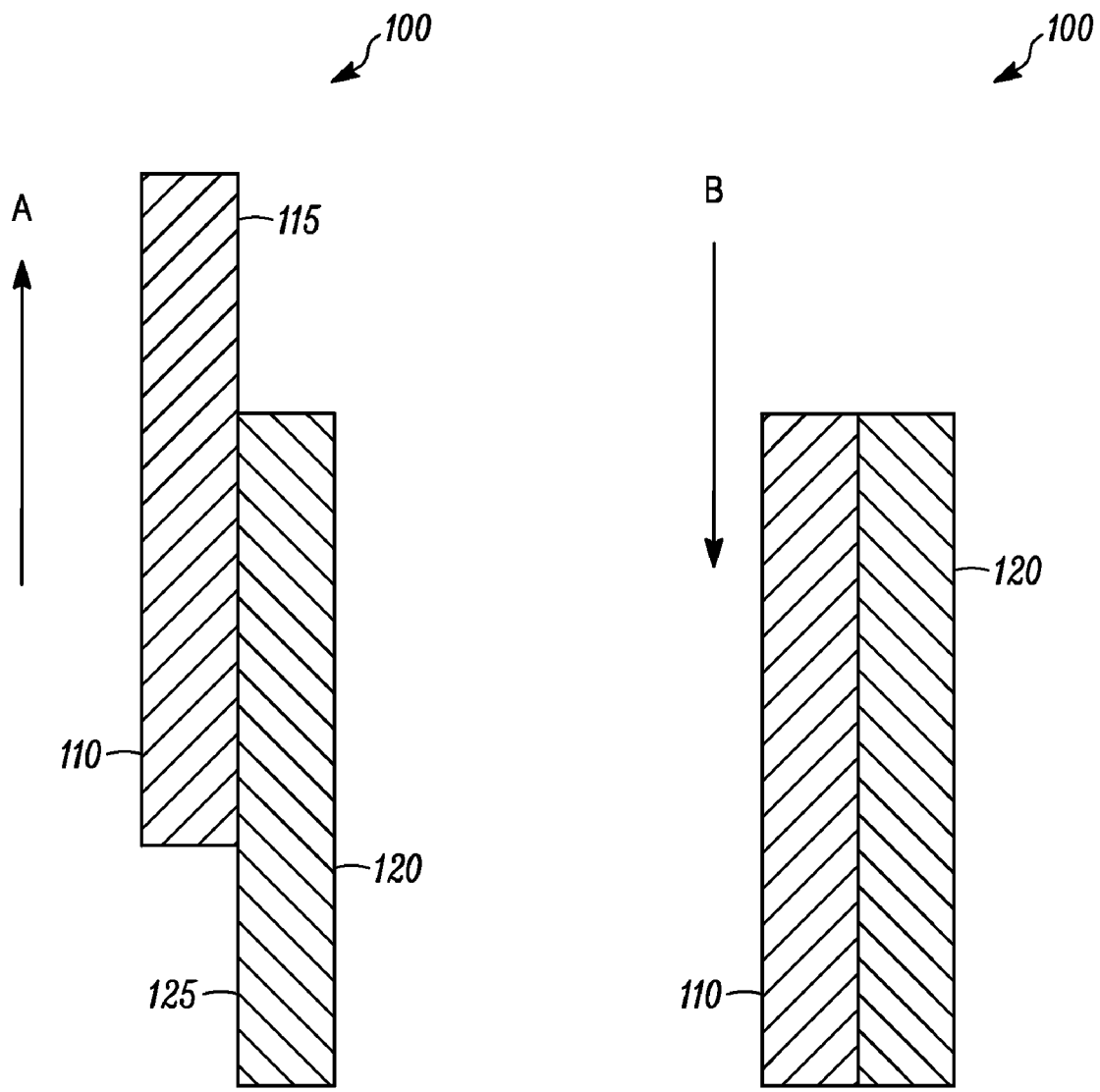
*FIG. 1*  *FIG. 2*

ELECTRONIC DEVICE AND ARRANGEMENT FOR PROVIDING COMMUNICATION BETWEEN BODY PARTS THEREOF

TECHNICAL FIELD

The technical field relates generally to an electronic device and arrangement for providing communication between body parts thereof. More particularly, the technical field relates to an apparatus for providing communication between body parts of an electronic device, where the body parts are moveable relative to one another.

BACKGROUND

The design of devices, such as mobile telephone handsets, is becoming increasingly varied and more complex for manufacturers attempting to differentiate such devices from those of their competitors.

In particular, the traditional 'candy bar' design of mobile telephone handsets, where the handset comprises generally of a single, substantially rectangular body part, is now considered relatively uninteresting.

Furthermore, it is a significant design consideration to minimise the general size of the handset, in particular when not in use, for example when in a standby mode/configuration. Due to the practical limitations of how small a keypad and a display can be designed, whilst maintaining functionality and usability, the candy bar design suffers from severe practical limitations in how small the handset can be designed.

To overcome these problems, numerous variations in design have been utilised by handset manufacturers. Well known design variations include clam-shell designs, slide designs, rotation designs, etc.

In general, such designs comprise two body parts: one comprising a keypad; the other comprising a screen or display. In this way, the keypad and/or display can be 'hidden' when the handset is not in use, i.e. when in a standby mode/configuration, thereby significantly reducing the size of the device.

As will be appreciated by a skilled artisan, a problem encountered by such designs is that of communication between the two body parts. For each of these body parts, a mechanism is required for not only facilitating and permitting movement between the two body parts, but also for enabling communication there between.

Known mechanisms in general rely on one of two principle methods of electrically coupling the two body parts: the first method utilises wires or cables; and the second method uses brush contacts.

Using wires or cables, it is possible to provide a plurality of individual channels, but a designer needs to consider preventing twisting of the wires/cables. Consequently, for rotation designs, the rotation is limited to less than 360 degrees. Furthermore, for slide designs, it is necessary to provide a volume in which the cables/wires are located. This is extremely wasteful of value space, in particular in relation to devices such as mobile telephone handsets, where size is a key design factor.

With brush contacts, channel density and transfer rate are limited due to size constraints. Furthermore they are mechanically relatively complicated to manufacture and unreliable.

As will be appreciated by a skilled artisan, use of these known methods of providing communication between the two body parts necessarily requires accepting one or more of the aforementioned limitations.

Thus, there exists a need for an improved method and apparatus for providing communication between moveable body parts of an electronic device.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

FIGS. 1 to 7 illustrate an exemplary embodiment of the invention.

DETAILED DESCRIPTION

Figure 3:
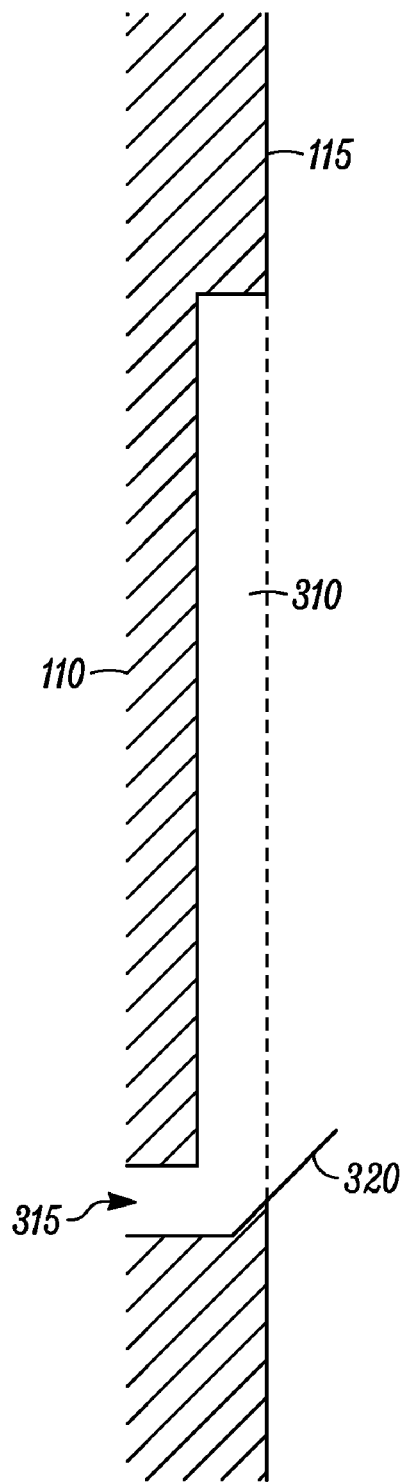

Before describing in detail embodiments that are in accordance with the present invention, it should be observed that the embodiments reside primarily in components related to an apparatus for providing communication within an electronic device.

Accordingly, the components have been represented where appropriate by conventional symbols in the drawings, showing only those specific details that are pertinent to understanding the embodiments of the invention so as not to obscure the disclosure with details that will be readily apparent to those of ordinary skill in the art having the benefit of the description herein. Thus, it will be appreciated that for simplicity and clarity of illustration, common and well-understood elements that are useful or necessary in a commercially feasible embodiment may not be depicted in order to facilitate a less obstructed view of these various embodiments.

Generally speaking, pursuant to the various embodiments, there is provided an electronic device comprising an arrangement for providing communication between a first body part and a second body part of the electronic device, the first and second body parts moveable relative to one another. Each body part comprises a contact surface, the contact surfaces being located generally adjacent one another. At least one contact surface comprises an optical light guide component.

The use of optical light guide components allows optical signals to be transmitted between the first and second body parts in either of the first or second configurations of the electronic device, or in any position there between.

Furthermore, utilising optical signals allows for multiplexing wavelengths of the optical signals, and for bi-directional communication along the same optical path. Consequently, a single optical path can by used for transmitting a plurality of optical signals, significantly reducing the volume required to implement communication mechanisms between the body parts.

In addition, optical signals do not suffer from electromagnetic interference. Consequently, a transfer rate of information can be significantly increased in comparison to electrical communication mechanisms.

The use of optical light guides further reduces the complexity of the communication mechanism, as well as improving reliability.

Those skilled in the art will realize that the above recognized advantages and other advantages described herein are merely exemplary and are not meant to be a complete rendering of all of the advantages of the various embodiments of the invention.

Referring now to the drawings, and in particular FIG. 1 and FIG. 2, an electronic device comprises a sliding design between two moveable parts is shown and indicated generally at 100. Those skilled in the art, however, will recognize and appreciate that the specifics of this illustrative example are not specifics of the invention itself and that the teachings set forth herein are applicable in a variety of alternative settings. For example, since the teachings described herein do not depend on a sliding design between two moveable parts, they can be applied to any type of multi-part configuration although a sliding design is shown in this embodiment. As such, alternative implementations of multi-part electronic devices are contemplated and are considered as being within the scope of the various teachings described. Referring back to FIG. 1 and FIG. 2, the electronic device 100 comprises a first body part 110 and a second body part 120, moveable relative to one another. For this illustrated embodiment, the two body parts 110, 120 are moveable relative to one another by way of a sliding movement, as indicated by arrows 'A' and 'B'.

FIG. 1 illustrates the electronic device 100 in a first configuration; with the first body part 110 moved in the direction of arrow 'A' relative to the second body part 120.

FIG. 2 illustrates the electronic device 100 in a second configuration; with the first body part 110 moved in the direction of arrow 'B' relative to the second body part 120.

Each of the body parts 110, 120 comprises a contact surface 115, 125, the contact surfaces 115, 125 being located generally adjacent one another, along a plane through which the two body parts 110, 120 move relative to one another.

Referring now to FIG. 3, there is illustrated a cross-sectional view of a section of the first body part 110. An optical light guide component 310 is provided within a portion of the contact surface 115 of the first body part 110.

The optical light guide component 310 may comprise a generally hollow channel, along which optical signals are capable of travelling. It is anticipated that the surfaces of such a hollow channel may be provided with a generally reflective coating to improve optical properties.

Alternatively, the optical light guide component 310 may comprise a substantially transparent material, for example polymethyl methacrylate, polystyrene, polyimide, polycarbonate, or any other suitable transparent polymer.

The optical light guide component 310 further comprises an access channel 315 located generally toward an end of the optical light guide component 310, through which optical signals are capable of being introduced into, and/or escape from, the optical light guide component 310.

The optical light guide component 310 further comprises a reflecting element 320. In one embodiment of the invention, for light efficient in/out-coupling, the reflecting or better deflecting elements are shaped. It is envisaged that this kind of shaping may, in some instances, be rather sophisticated. The reflecting element 320 aids in directing optical signals from the access channel 315 along the optical light guide component 310, and/or from the optical light guide component 310 along the access channel 315.

Figures 4, 5:
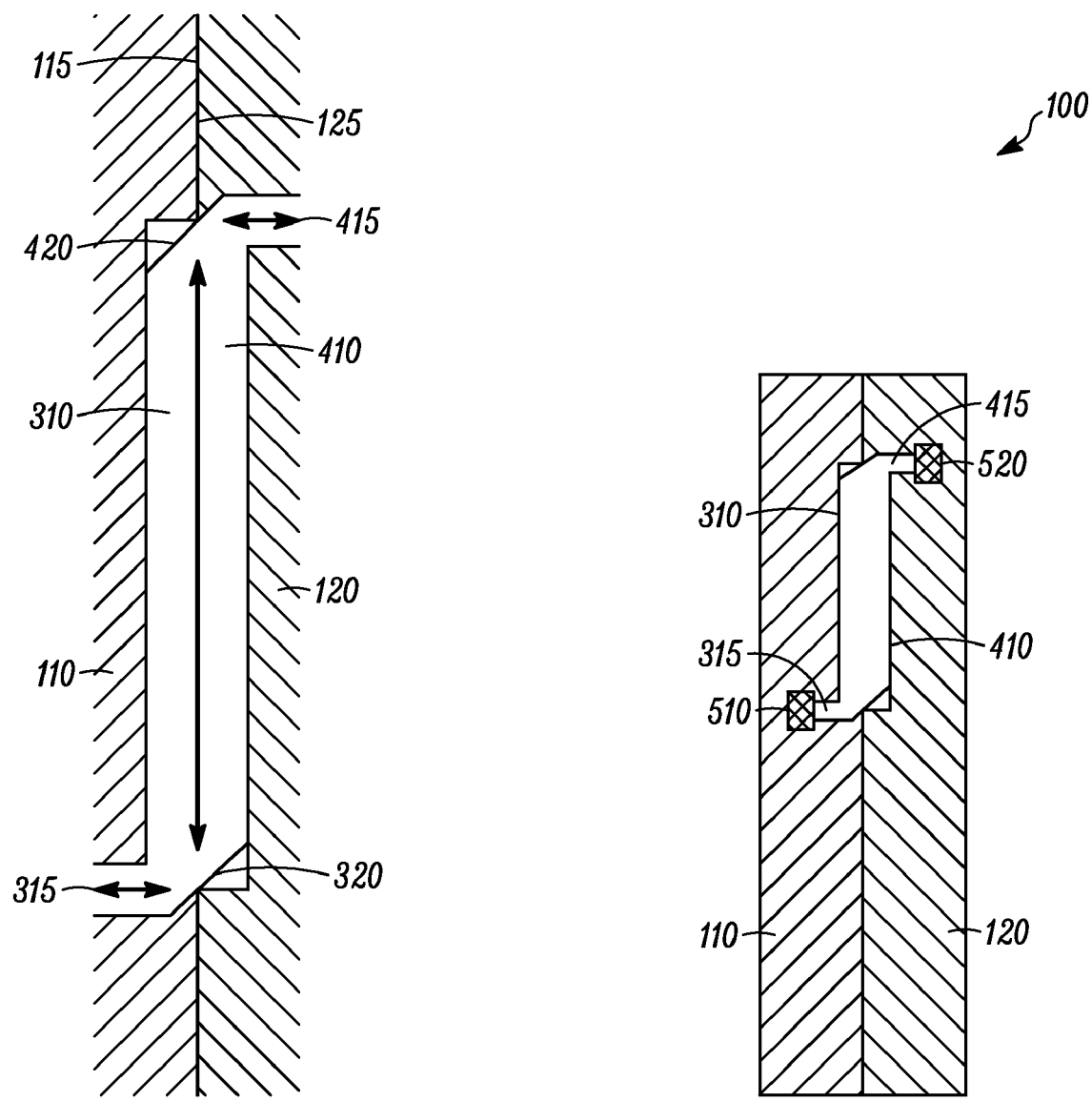

Referring now to FIG. 4, there is illustrated a cross-sectional view of a portion the section of the first body part 110 in situ with a corresponding section of the second body part 120, when the electronic device 100 is in the second configuration illustrated in FIG. 2. For the embodiment illustrated in FIG. 4, the second body part 120 also comprises an optical light guide component 410 located within the contact surface 125 thereof.

For the embodiment illustrated in FIG. 4, the optical light guide 410 of the second body part 120 is generally an inverted mirror image of the optical light guide 310 of the first body part 110, comprising an access channel 415 and a reflecting element 420 toward an end of the optical light guide 410 generally opposing that of the optical light guide 310 of the first body part 110.

As illustrated in FIG. 4, optical signals are capable of being transmitted from the first body part 110 along the access channel 315; directed along the optical light guide components 310, 410 by the reflecting element 320; and directed down the access channel 415 by the reflecting element 420 to the second body part 120.

Conversely, it is envisaged in other embodiments that optical signals may be capable of being transmitted from the second body part 120 along the access channel 415; directed along the optical light guides 310, 410 by the reflecting element 420; and directed down the access channel 315 by the reflecting element 320 to the first body part 110.

Referring now to FIG. 5, there is illustrated a cross-sectional view of the electronic device 100 in the second configuration illustrated in FIG. 2, showing the optical light guide components 310, 410. Each of the body parts 110, 120 comprises optical signalling component 510, 520 for transmitting and/or receiving optical signals. The optical signalling components 510, 520 are provided at ends of the access channels 315, 415 of the optical guide components 310, 410 that are distal relative to the surfaces 115, 125 (FIG. 4) of the body parts 110, 120.

Figure 6:
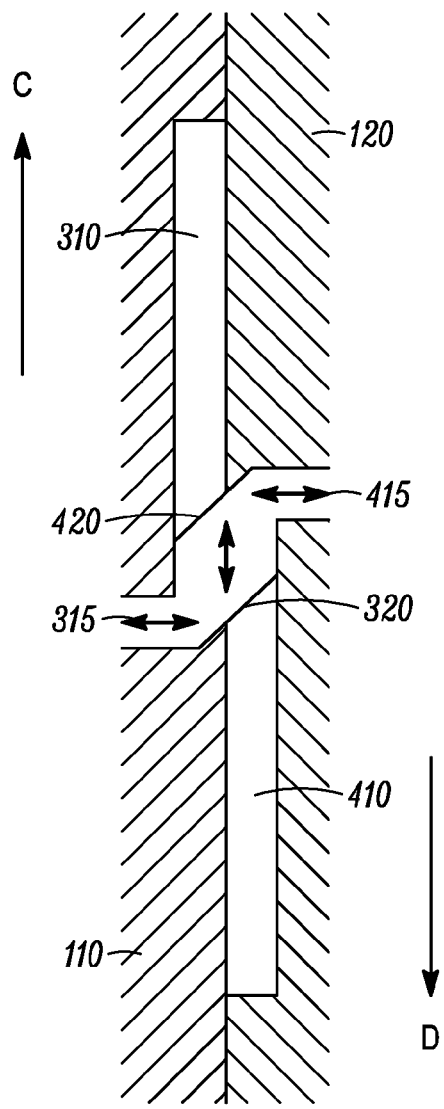

Referring now to FIG. 6, there is illustrated a cross-sectional view of portions of the sections of the first and second body parts 110, 120 illustrated in FIG. 4, in an alternative embodiment, where the electronic device is in the first configuration illustrated in FIG. 1.

In this first configuration, the first and second body parts 110, 120, have moved relative to one another, generally in the directions indicated by arrows C and D respectively. Accordingly, the optical light guide components 310, 410 have also moved relative to one another, with the access channels 315, 415 moving closer to one another.

In particular, the optical light guide components 310, 410 at least partly overlap one another substantially throughout the range of movement of the body parts 110, 120, such that the optical light guide components 310, 410 cooperate to provide an optical path between the two body parts throughout the range of movement of the body parts.

Figure 7:
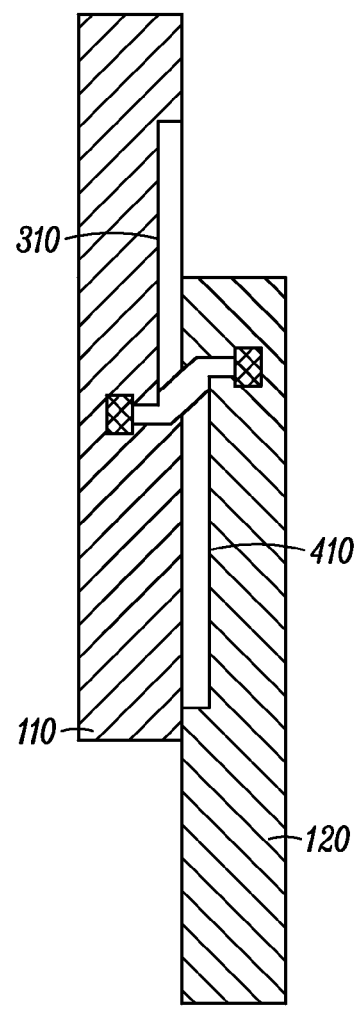

In this manner, optical signals are still capable of being transmitted between the first and second body parts 110, 120. However, they are only required to travel along a reduced length of the optical light guide components 310, 410. Referring now to FIG. 7, there is illustrated a further cross-sectional view of the electronic device 100 in the first configuration illustrated in FIG. 1, showing the optical light guide components 310, 410. In one embodiment, it is envisaged that the open waveguide may show less attenuation if it is protected (e.g. against dust, etc.) and not open as suggested in FIG. 7. Nevertheless, dust and moisture, to some degree, may be tolerated.

As will be appreciated by a skilled artisan, the use of such optical light guide components 310, 410 allows optical signals to be transmitted between the first and second body parts 110, 120 in either of the first or second configurations of the electronic device 100, or in any position there between.

Furthermore, it is envisaged that utilising optical signals in the aforementioned manner allows for multiplexing multiple wavelengths of the optical signals, and for bidirectional communication along the same optical path. Consequently, a single optical path can by used for transmitting a plurality of optical signals, thereby significantly reducing a volume required to implement communication mechanisms between the respective body parts 110, 120.

In addition, it is noted that optical signals do not suffer from electromagnetic interference. Consequently, the transfer rate of information can be significantly increased in comparison to electrical communication mechanisms.

The use of optical light guides further reduces the complexity of the communication mechanism, as well as improving on reliability.

As previously mentioned, in an exemplary embodiment of the invention, the optical light guide components 310, 410 may comprise a substantially solid, transparent material. For such an embodiment, a liquid matching fluid may be provided between the optical light guide components 310, 410. Further information on suitable matching fluids is available from www.cargille.com: optical coupling liquids or index matching liquids for polymers.

Figure 8:
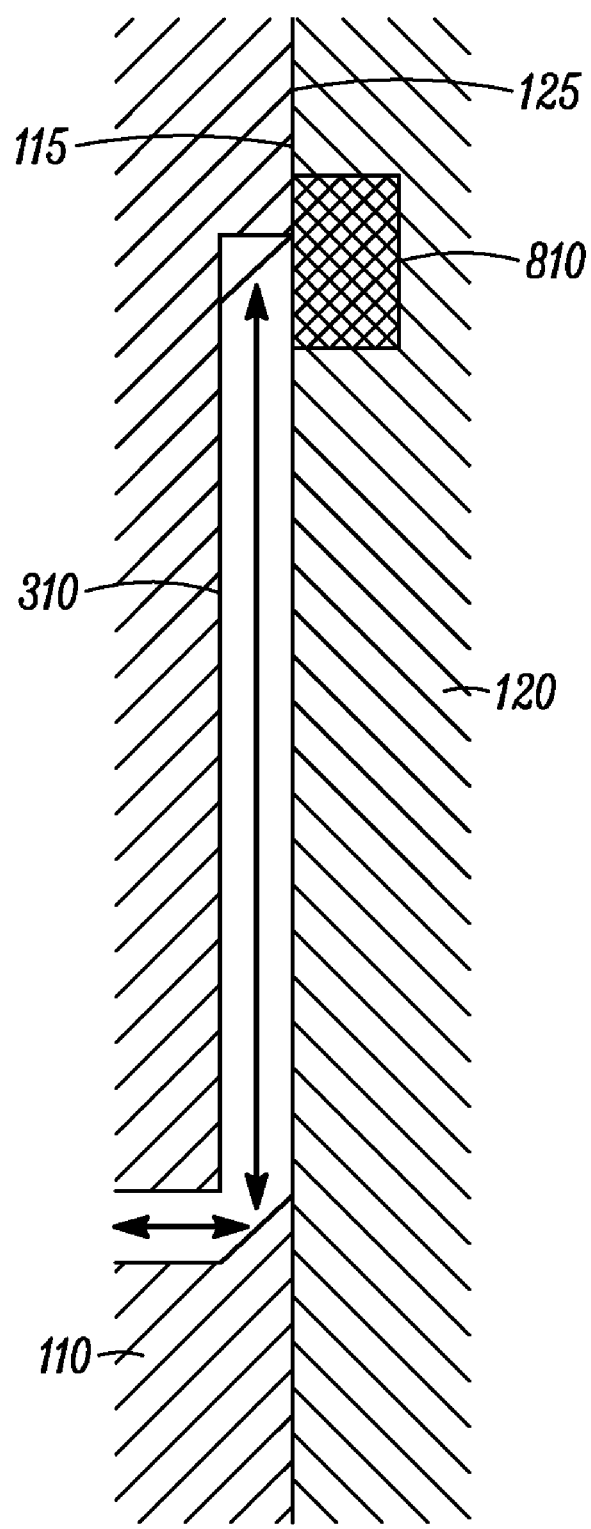
FIG. 8 illustrates a cross-sectional view of the electronic device in accordance with an alternative embodiment of the invention.

Referring now to FIG. 8, there is illustrated a cross-sectional view of the sections of the first and second body parts 110, 120 in accordance with an alternative embodiment of the invention.

In this alternative embodiment of the invention, the first body part 110 comprises the optical light guide component 310 of FIG. 3 within the contact surface 115 thereof. However, the second body part 120 comprises an optical signalling component 810, located within the contact surface 125 thereof.

In this manner, optical signals are transmitted between the first and second body parts 110, 120 via the optical light guide component 310 of the first body part 110. The optical signals are transmitted from and/or received by, the second body part directly from/by the optical signalling component 810.

Figures 9, 10:
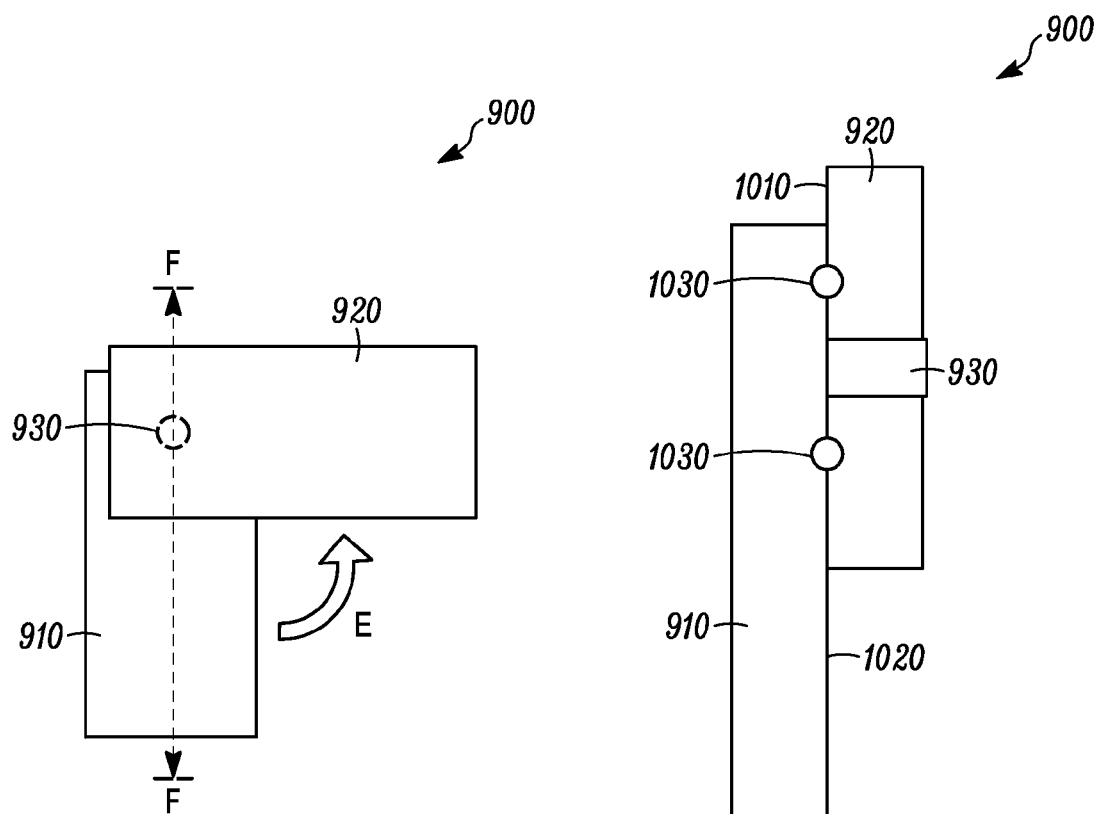
FIGS. 9 to 16 illustrate a further alternative embodiment of the invention.

Referring now to FIG. 9 there is illustrated an electronic device 900 adapted for implementing an alternative exemplary embodiment of the invention.

The electronic device 900 comprises a first body part 910 and a second body part 920, moveable relative to one another. For this illustrated embodiment, the second body part 920 is moveable relative to the first body part 910 by way of a rotational movement, as indicated by arrow E, about a pivotal coupling 930. Referring now to FIG. 10, there is illustrated a cross-sectional view of the electronic device 900 of FIG. 9, through the line F:F. The first and second body parts 910, 920 each comprise a contact surface 1010, 1020 respectively. The contact surfaces 1010, 1020 are located generally adjacent one another, along a plane through which the two body parts 910, 920 move relative to one another. However, as mentioned, it is envisaged that physical contact between body parts 910 and 920 may be avoided by use of a small air gap.

An optical light guide 1030 is located between the first and second body parts 910, 920, substantially embedded within at least one of the contact surfaces 1010, 1020 thereof.

Figure 11:
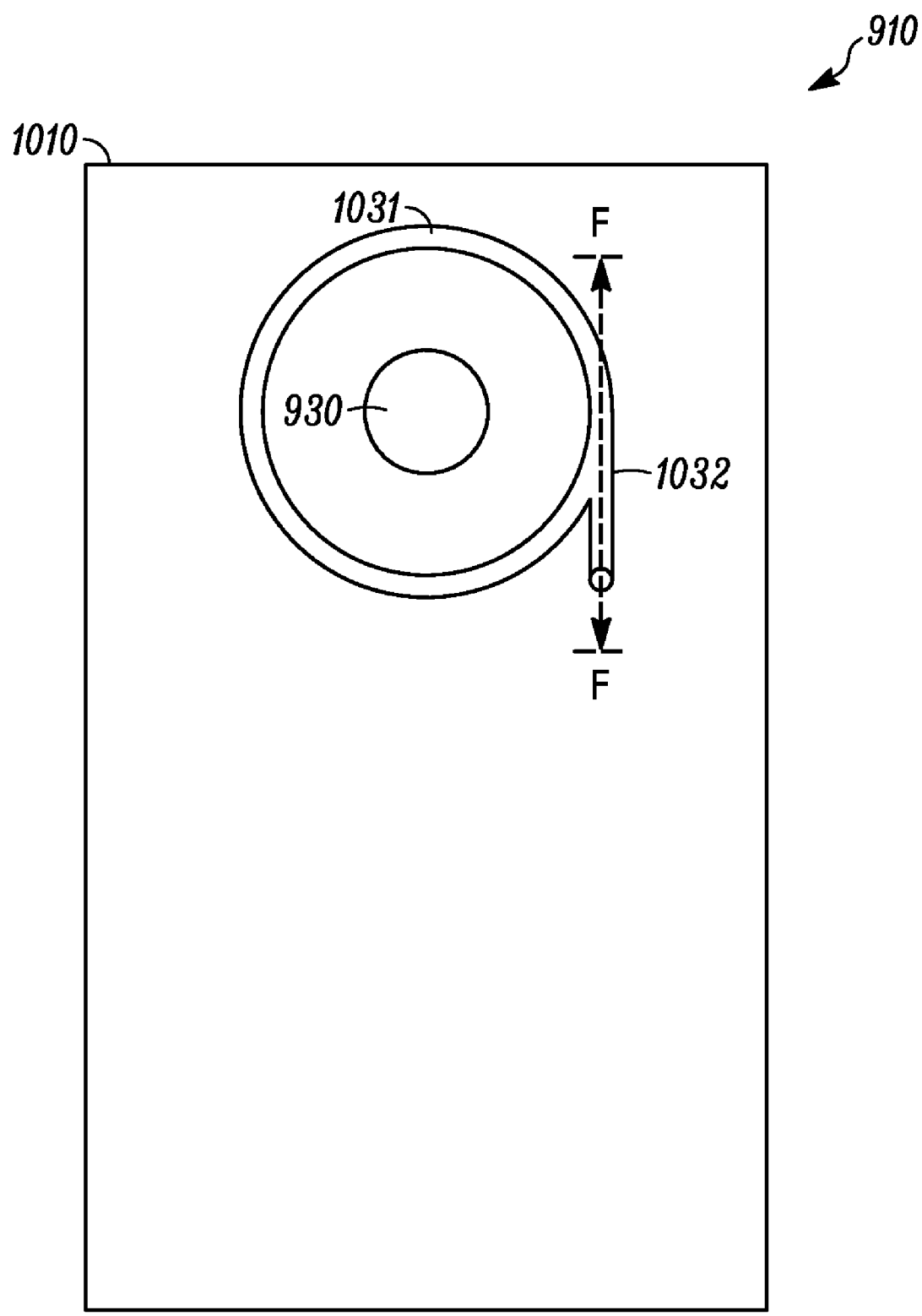

Referring now to FIG. 11, there is illustrated a plan view of the contact surface 1010 of the first body part 910. A substantially circular first optical light guide component 1031 is embedded within the contact surface 1010, and generally encircling the pivotal coupling 930.

The first optical light guide component 1031 of the first body part 910, together with a second optical light guide component 1035 (see FIG. 13) of the second body part 920, substantially form the light guide. The first optical light guide component 1031 may comprise a generally hollow channel, along which optical signals are capable of travelling. It is anticipated that the surfaces of such a hollow channel may be coated with a generally reflective coating to improve optical properties.

Alternatively, the first optical light guide component 1031 may comprise a substantially solid, transparent material, for example: polymethyl methacrylate, polystyrene, polyimide, polycarbonate, or any other suitable transparent polymer.

The first optical light guide component 1031 further comprises an access channel 1032 extending therefrom, through which optical signals are capable of entering and/or leaving the optical light guide.

In an alternative embodiment of the invention, the first optical light guide component 1031 may comprise a plurality of access channels 1032 extending therefrom, for example for signal broadcasting, and/or in combination with wavelength division multiplexing.

Figure 12:
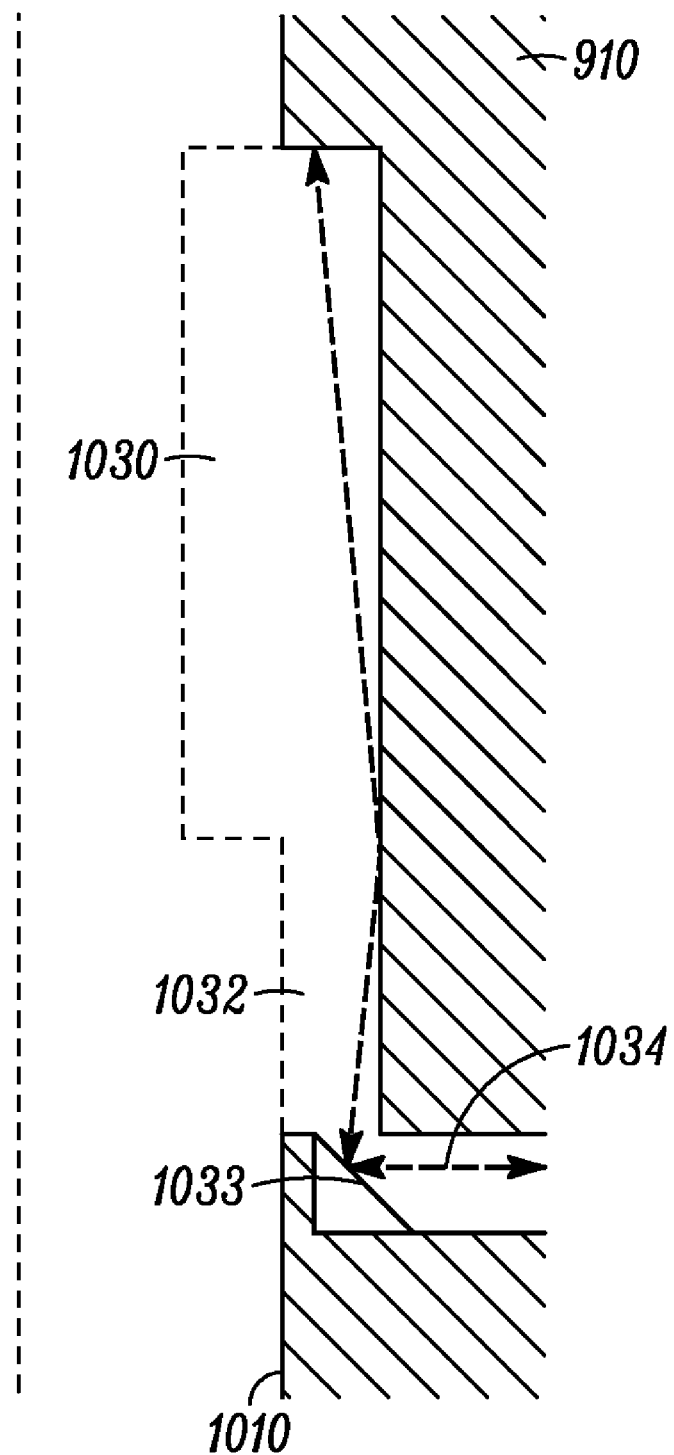

Referring now to FIG. 12, there is illustrated a cross-sectional view of a section of the first optical light guide component (1031), along the line F:F of FIG. 11. At an end of the access channel 1032, there is provided a reflecting element 1033, and an optical conduit 1034 extending substantially perpendicular therefrom, generally into the first body part 910.

In this manner, optical signals travelling around the optical light guide 1030 are capable of entering the access channel 1032, from where they are directed down the optical conduit 1034 by the reflecting element 1033, to an optical signalling component (not shown) adapted to transmit and/or receive optical signals.

Additionally, and/or alternatively, optical signals may be introduced into the optical conduit 1034 by the optical signalling component. Such optical signals are directed along the access channel 1032 by the reflecting element 1033, and from there enter the optical light guide 1030.

Figure 13:
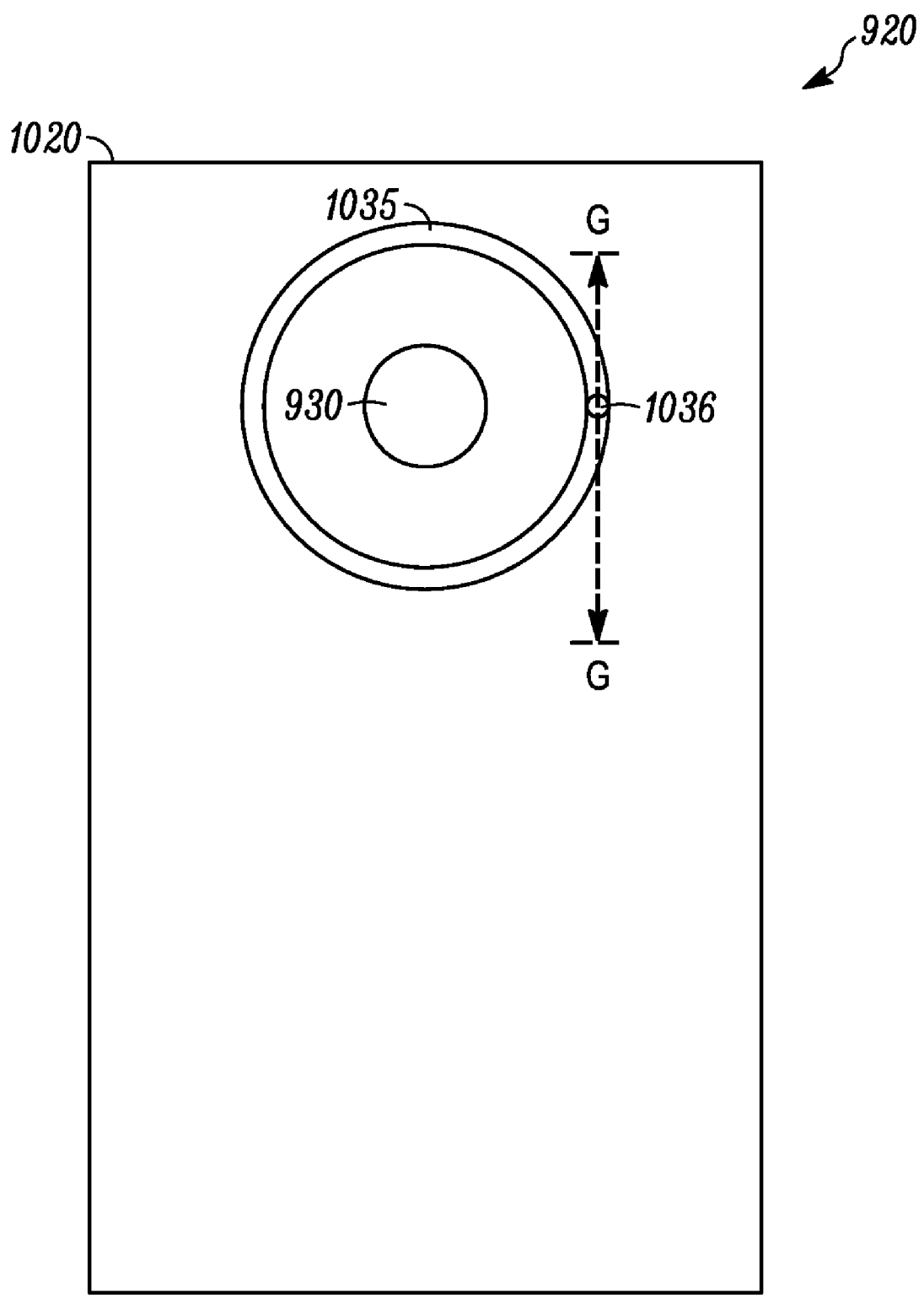

Referring now to FIG. 13, there is illustrated a plan view of the contact surface 1020 of a portion of the second body part 920. A substantially circular second optical light guide component 1035 is embedded within the contact surface 1020, and generally encircling the pivotal coupling 930. As previously mentioned, the second optical light guide component 1035 of the second body part 920, along with the first optical light guide component 1031 of the first body part 910, substantially form the light guide 1030.

Once again, the second optical light guide component 1035 may comprise a generally hollow channel, along which optical signals are capable of travelling. It is anticipated that the surfaces of such a hollow channel may be coated with a generally reflective coating to improve optical properties.

Alternatively, the first optical light guide component 1031 may comprise a substantially solid, transparent material, for example a clear plastic. The second optical light guide component 1035 comprises an access conduit 1036, extending generally into the second body part 920 (see FIG. 14).

In an alternative embodiment of the invention, the second optical light guide component 1035 may comprise a plurality of access conduits 1036 extending therefrom, for example for signal broadcasting, and/or in combination with wavelength division multiplexing.

Figure 14:
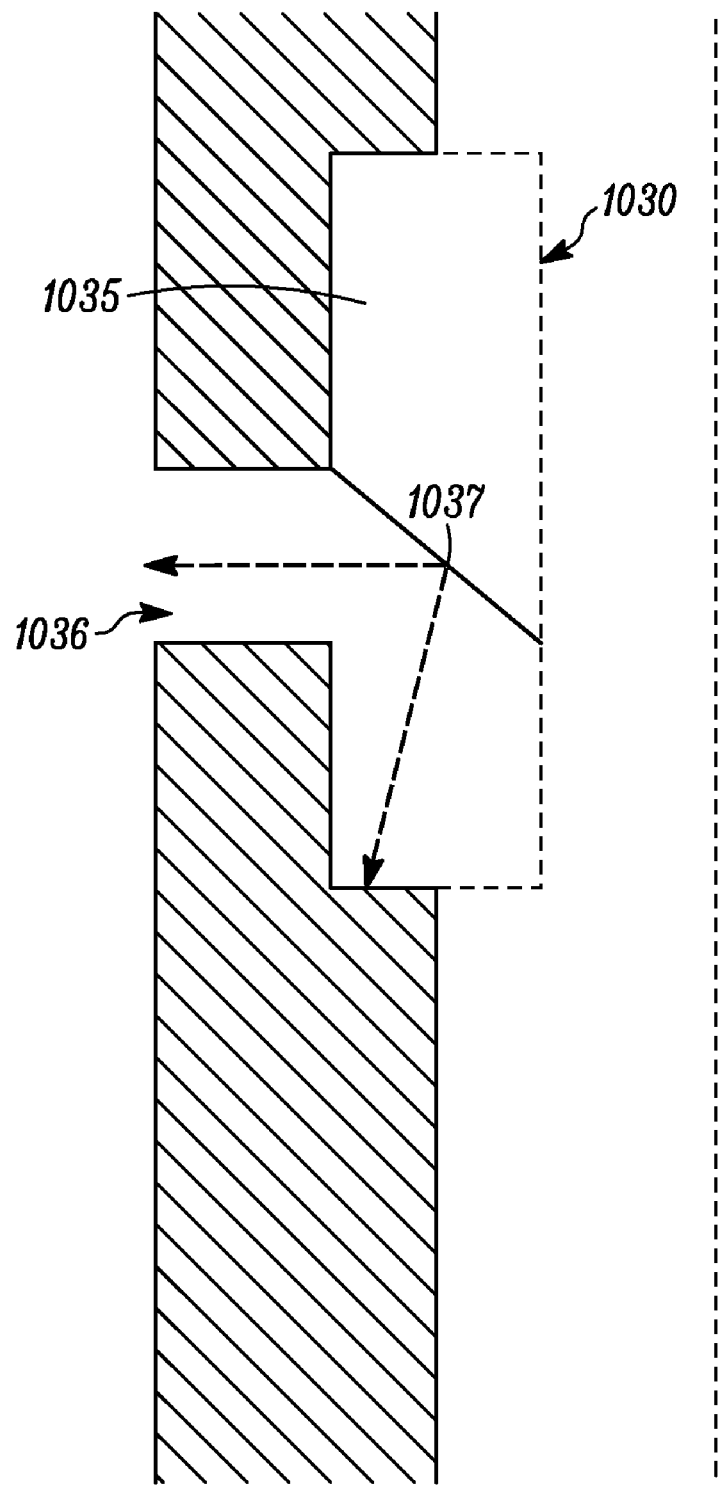

Referring now to FIG. 14, there is illustrated a cross-sectional view of a section of the second optical light guide component 1035, along the line G:G of FIG. 13. A reflecting element 1037 is provided within the second optical light guide component 1035, substantially adjacent the access conduit 1036.

In this manner, optical signals travelling around the optical light guide 1030 are directed down the access conduit 1036 by the reflecting element 1037, to an optical signalling component (not shown), adapted to transmit and/or receive optical signals.

Additionally, and/or alternatively, optical signals may be introduced into the access conduit 1036 by the optical signalling component. Such optical signals are then directed into and along the optical light guide 1030 by the reflecting element 1037.

Figure 15:
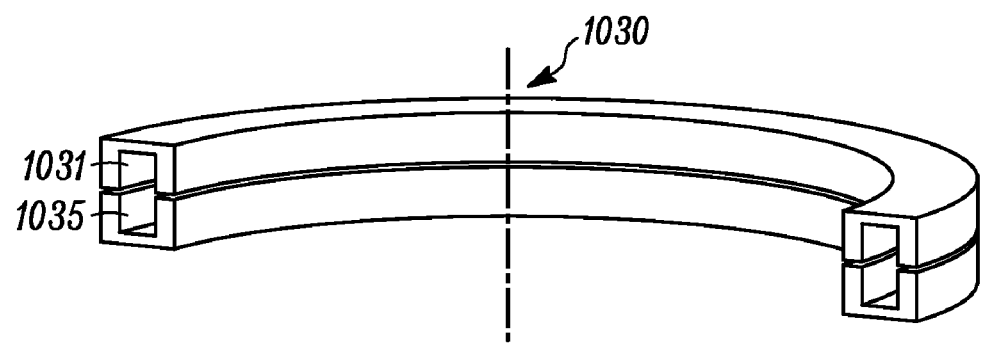

Referring now to FIG. 15, there is illustrated the first and second light guide components 1031, 1035 forming the light guide 1030. For the illustrated embodiment, the light guide components 1031, 1035 comprise opposing, generally 'U' or 'D' shaped cross-sectional configurations, such that the light guide 1030 comprises a generally oval, or circular, cross-sectional configuration.

It will be appreciated by a skilled artisan that the invention is not limited to light guide components comprising a generally 'U' or 'D' shaped cross-sectional configuration. By way of example, FIG. 22 illustrates cross-sectional configurations of light guide components that could alternatively be used.

Figure 22:
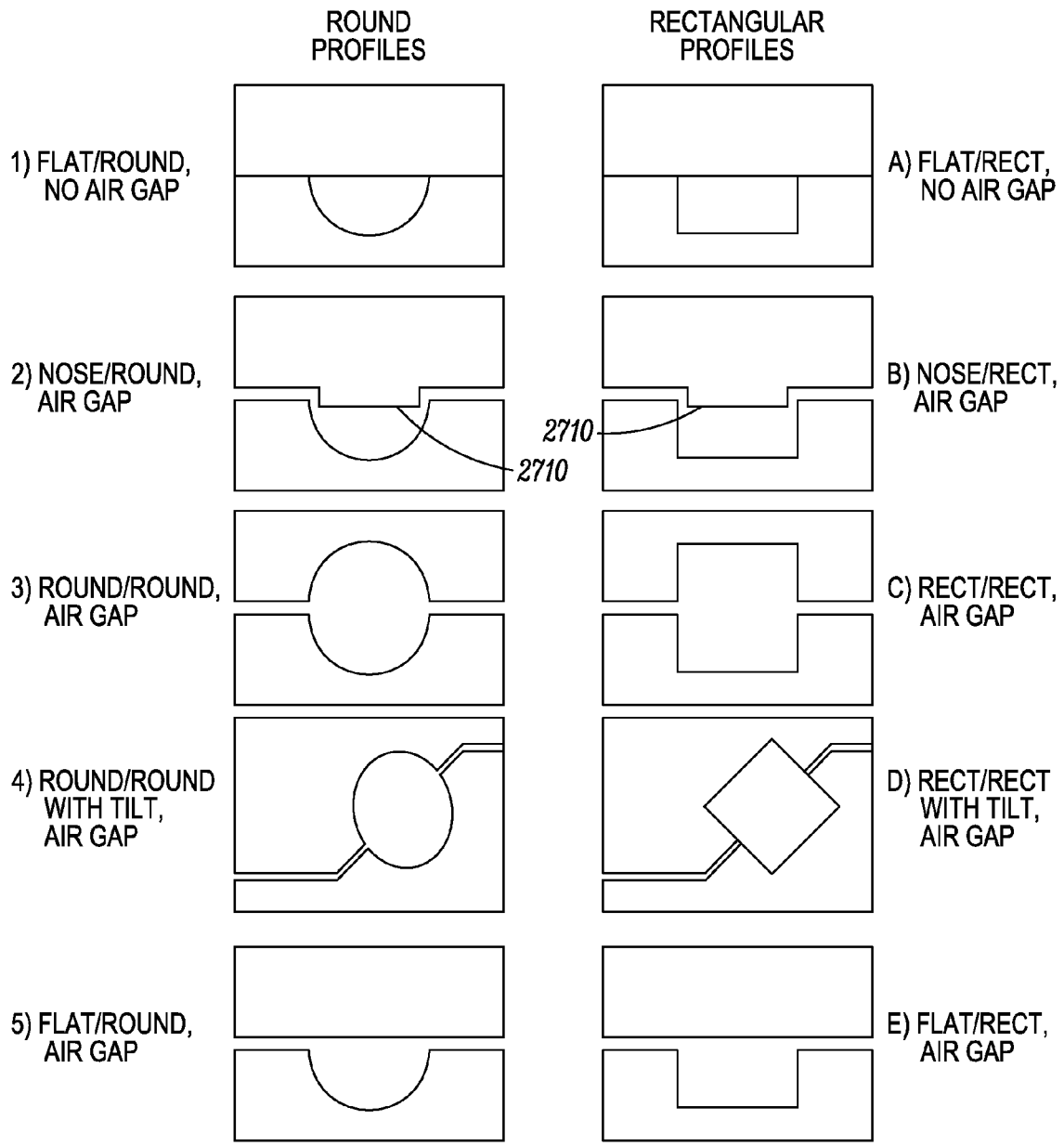
FIG. 22 illustrates examples of cross-sectional configurations of light guide components according to embodiments of the invention.

As illustrated in cross-sectional configurations '2' and 'B' of FIG. 22, one of the light guide components may comprise a generally protruding cross-sectional element, or 'nose' 2710 extending generally from the respective contact surface, and which in use is received within a generally recessed formation of a light guide component of the opposing contact surface.

Figure 16:
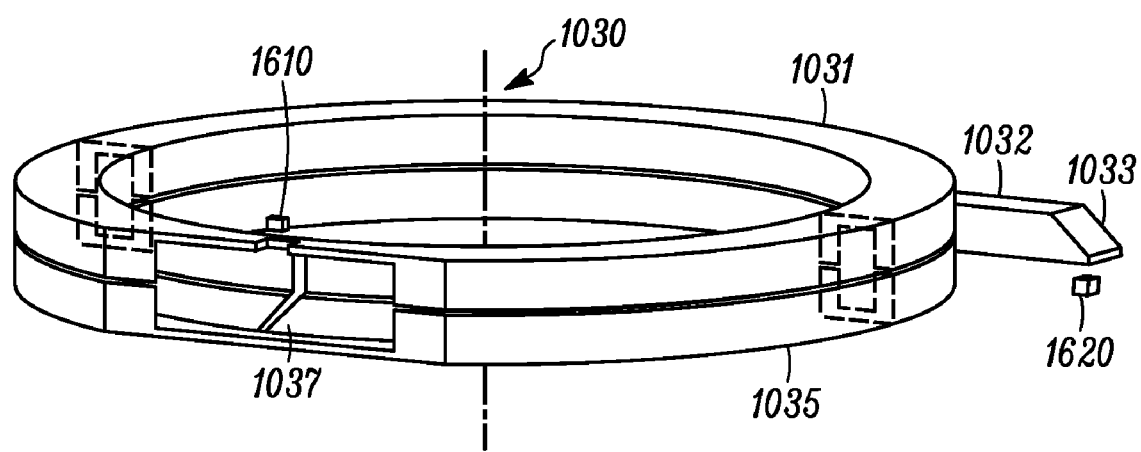

Referring now to FIG. 16, there is illustrated an example of an optical signal path for the embodiment illustrated in FIGS. 9 to 15. A first optical signalling component 1610, located within the second body part 920, introduces an optical signal into the optical light guide 1030, for example by way of access conduit 1036. The optical signal is directed along the optical light guide 1030 by reflecting element 1037.

The optical signal travels around the optical light guide 1030, reflecting off the surfaces of the first and second optical light guide components 1031, 1035. At least a portion of the optical signal enters the access channel 1032, and is then directed to a second optical signalling component 1620, located within the first body part 910, for example along optical conduit 1034.

In this exemplary embodiment, the reflecting element 1037 comprises a non-reflective, or absorbing, rear surface, such that any portion of the optical signal not entering the access channel 1032 is absorbed, i.e. not reflected back along the optical light guide 1030. In this manner, spurious optical signals caused by continued travel of optical signals around the optical light guide 1030 are substantially alleviated.

As will be appreciated by a skilled artisan, the provision of at least one generally continuous, circular optical light guide component 1031, 1035 enables optical signals to be transmitted between the first and second body parts 910, 920 substantially throughout the entire range of movement of the first and second body parts 910, 920 relative to one another.

Furthermore, for the embodiment illustrated in FIGS. 9 to 16, this method of providing communication between the first and second body parts 910, 920 leaves the pivotal coupling 930 free to be utilised for additional functionality, such as a camera or the like.

A further advantage provided by this embodiment of the invention is that, unlike communication mechanisms comprising wires or cables, there is no problem with regard to wires/cables becoming twisted. Consequently, rotation of greater than 360 degrees is achievable. Additionally, unlike electrical brush contacts, channel density and transfer rate are not limited, and the problems associated with the brush contacts being mechanically complicated and unreliable are substantially alleviated.

As will be appreciated by a skilled artisan, it is still necessary to provide a power coupling between the two body parts, in order to avoid the need for each body part to comprise its own power source, such as a battery.

Thus, in an enhanced embodiment of the invention, the, or each, optical light guide component is provided with a metallic coating. For example, in the case of a substantially hollow light guide component, the metallic coating provides a substantially reflective surface of the light guide component. In this manner, the metallic coating may be utilised, in conjunction with, for example, brush contacts, to provide a power coupling between the two body parts.

Figures 17, 18, 19:
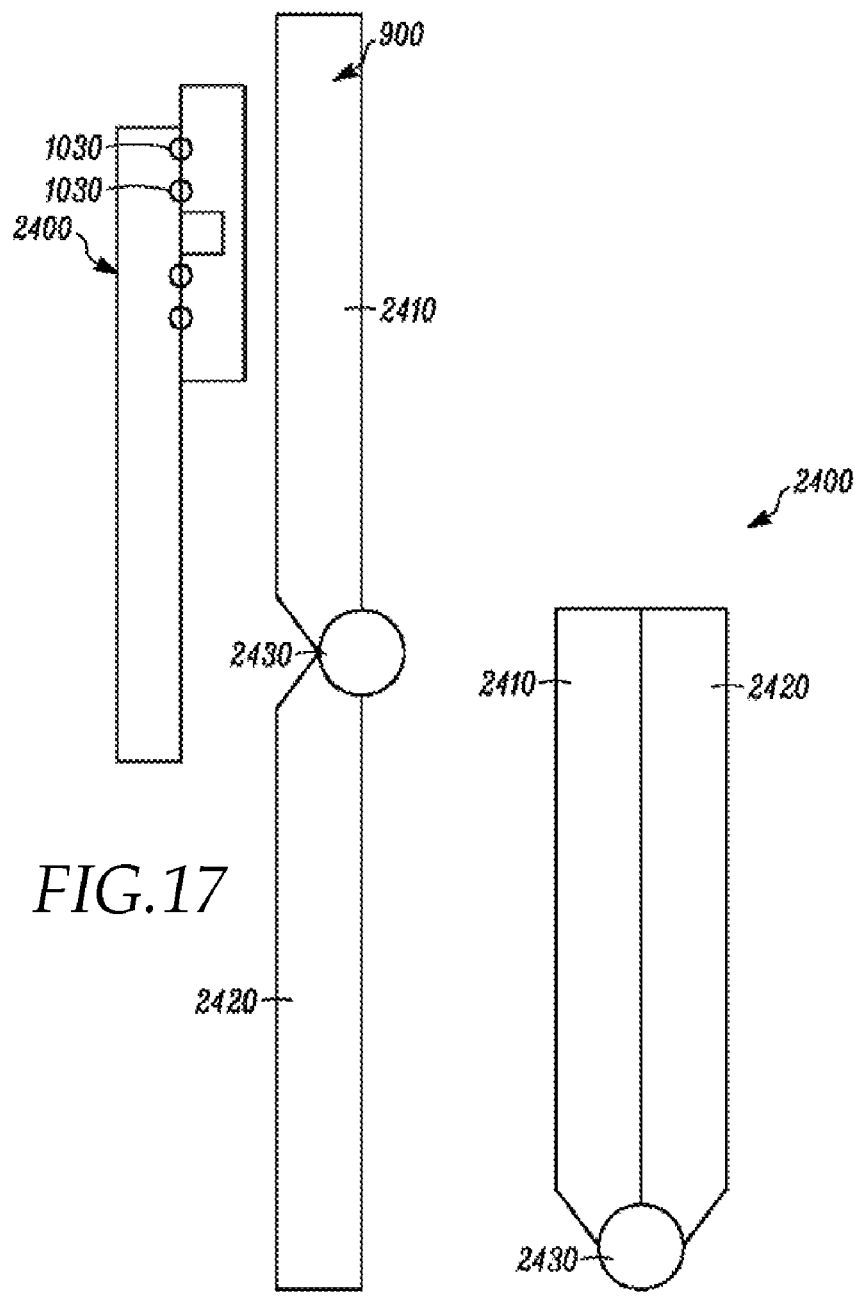
FIG. 17 illustrates a further alternative embodiment of the invention.
FIGS. 18 to 21 illustrate a further alternative embodiment of the invention.

Referring now to FIG. 17, there is illustrated an alternative embodiment of the invention, whereby an electronic device comprises a plurality of light guides. In this embodiment, the electronic device 900 comprises two light guides 1030, provided generally radially of one another.

In order to improve performance for high frequency signalling, it is anticipated that reflecting elements, such as reflecting elements 320, 420, 1033 and 1037 are generally tapered or the like such that they comprise a generally reduced diameter toward respective optical signalling components. In this manner, optical signals are effectively focused prior to being received by an optical signalling component, enabling high signalling rates.

Referring now to FIG. 18 and FIG. 19, there is illustrated a still further alternative embodiment of the invention. An electronic device 2400 comprises a first body part 2410 and a second body part 2420, moveable relative to one another. For this illustrated embodiment, the second body part 2420 is moveable relative to the first body part 2410 by way of a rotational movement, as indicated by arrow 'I', about a pivotal coupling 2430. Such a configuration is well known for devices, such as mobile telephone handsets, and is often referred to as a 'clam-shell' design.

Figure 20:
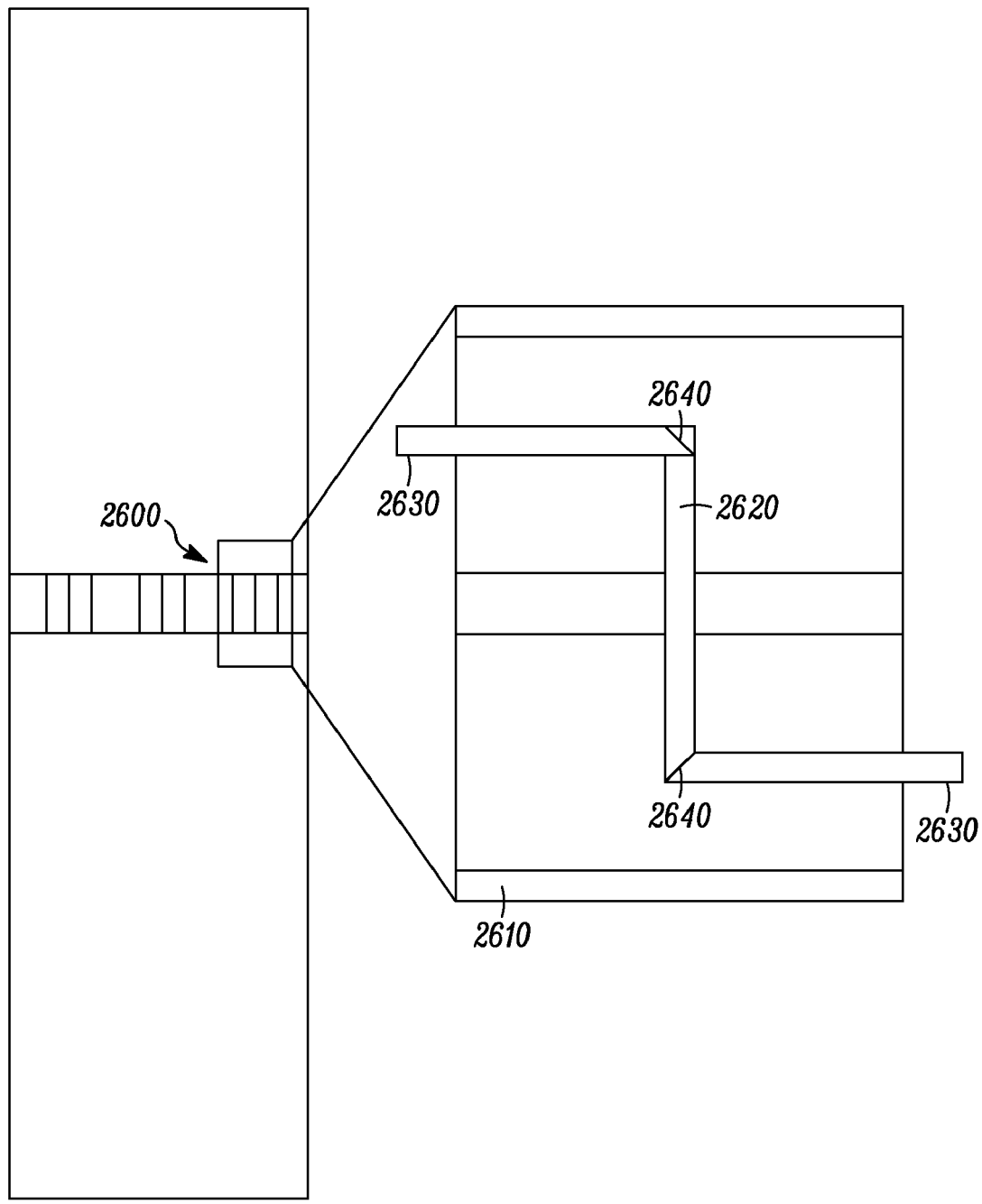
Figure 21:
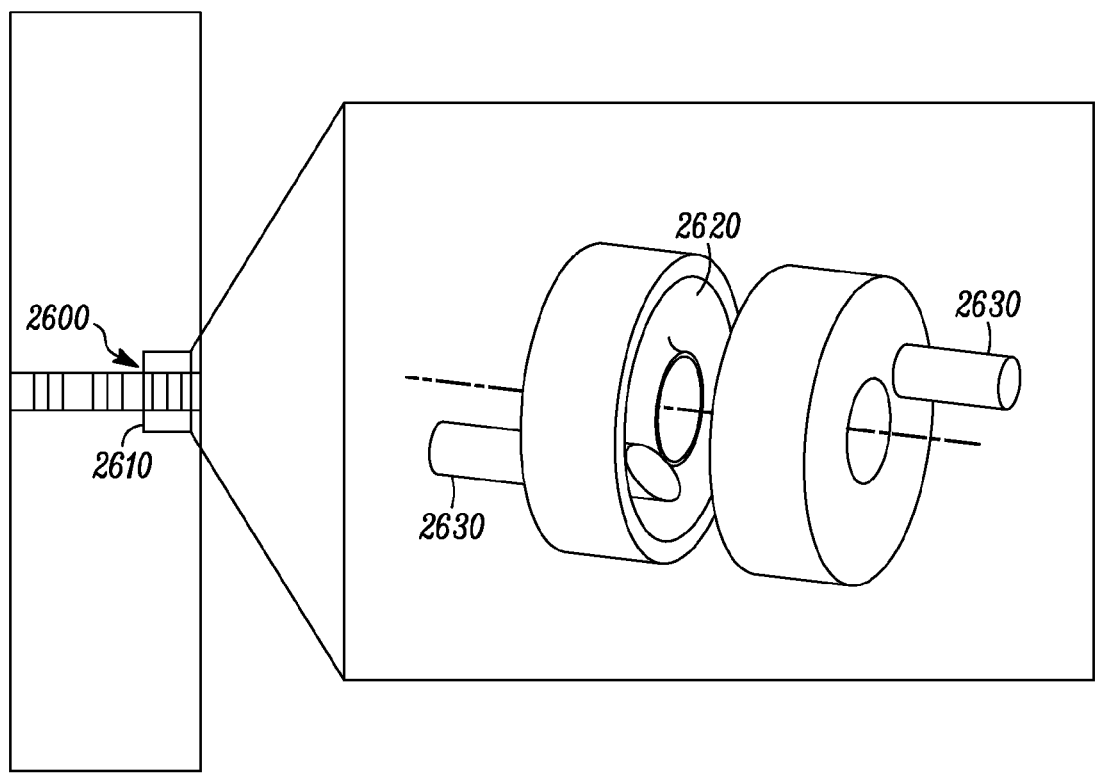

Referring now to FIGS. 20 and 21, there is illustrated an optical light guide 2610, located within a hinge mechanism 2600 of the electronic device 2400.

For the embodiment illustrated in FIGS. 20 and 21, optical signals enter and exit the optical light guide 2610 by way of optical channels 2620, 2630, which are coupled to optical signal transmitters and receivers (not shown).

As previously mentioned, optical light guide components implementing the inventive concepts described herein may comprise generally hollow channels, along which optical signals are capable of travelling. Alternatively, the optical light guide components comprising two or more substantially solid cores. In order to facilitate propagation of optical signals between optical light guide components comprising solid cores, it is anticipated that a matching fluid may be utilised between the optical light guide components. Such a matching liquid may also act as a lubricant between the optical light guide components to facilitate movement therebetween.

Thus, an improved apparatus for providing communication between a first body part and a second body part of an electronic device is provided. As will be appreciated by a skilled artisan, the invention in its various forms and embodiments may provide at least one or more of the following advantages:

(i) communication through greater than 360 degrees of rotation;

(ii) pivotal couplings remain free to be utilised for additional functionality, such as for a camera or the like;

(iii) ease of installation in comparison to electrical mechanisms due to capability of fabrication by way of moulded parts;

(iv) a single optical path can be support substantially simultaneous bidirectional communication;

(v) a single optical path can support wavelength multiplexing of optical signals, allowing a single optical path to carry multiple signals;

(vi) increased data rate since optical signals are not affected by electromagnetic interference;

(vii) reduced electromagnetic interference generated, so less impact on other components;

(viii) reduced mechanical failures in comparison to electrical brush contacts and wires/cables.

It will be appreciated by a skilled artisan that the various drawings of embodiments described herein are only intended as illustrative. In particular, the various components illustrated are not intended as being to scale, but rather as illustrative of general locations and configurations. By way of example, it is anticipated that optical communication paths utilised within the various embodiments of the present invention may be less than 10 cm in length.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms 'comprises', 'comprising', 'has', 'having', 'includes', 'including', 'contains', 'containing' or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by 'comprises . . . a', 'has . . . a', 'includes . . . a', 'contains . . . a' does not, without more constraints, preclude the existence of additional identical elements in the process, method, article, or apparatus that comprises, has, includes, contains the element. The terms 'a' and 'an' are defined as one or more unless explicitly stated otherwise herein. The terms 'substantially', 'essentially', 'approximately', 'about' or any other version thereof, are defined as being close to as understood by one of ordinary skill in the art. The term 'coupled' as used herein is defined as connected, although not necessarily directly and not necessarily mechanically. A device or structure that is 'configured' in a certain way is configured in at least that way, but may also be configured in ways that are not listed.

What is claimed is:

1. An electronic device comprising an arrangement for providing communication between a first body part and a second body part of the electronic device, the first and second body parts moveable relative to one another; each body part comprising a contact surface, the contact surfaces being located generally adjacent one another, wherein each contact surface comprises an optical light guide component, and wherein a hollow channel of an optical light guide that guides light parallel to the contact surfaces is formed using surfaces from each optical light guide component that exist along the hollow channel, and wherein the optical light guide is arranged to provide communication between the first body part and second body part using light that is directionally guided along the optical light guide by a reflecting element having a surface disposed across a substantial portion of the hollow channel.

2. The electronic device of claim 1, wherein the optical light guide components of the first body part and second body part at least partly overlap one another throughout a range of movement between the first body part and second body part.

3. The electronic device of claim 1, wherein optical signals are capable of being transmitted between the first and second body parts throughout a range of rotational movement between the first and second body parts that exceeds 360 degrees.

4. The electronic device of claim 1, wherein first and second body parts located generally adjacent one another are separated by an air gap.

5. The electronic device of claim 1, wherein at least one optical light guide component comprises a generally 'D' or 'U' shaped cross-sectional configuration.

6. The electronic device of claim 1, wherein communication between the first body part and the second body part is by way of bi-directional optical communication.

7. The electronic device of claim 1, wherein the optical light guide components support multi-channel communication between the first body part and the second body part by way of wavelength multiplexing.

8. The electronic device of claim 1, wherein the electronic device is a mobile telephone handset.

9. The electronic device of claim 1, wherein the substantial portion is approximately the entire cross section of the surfaces that exist along the hollow channel of one optical light guide component.

10. An electronic device comprising:
a light guide formed by a first hollow channel and a second hollow channel, wherein each hollow channel comprises longitudinal surfaces formed within a respective surface of one of a first and a second body part of the electronic device, and wherein the respective surfaces are generally adjacent to one another, and wherein the first and second body parts are movable relative to each other;
a first and a second light signaling component; and
a reflecting element having a surface disposed across a substantial portion of at least one of an access channel, the first hollow channel, and the second hollow channel in a manner to reflect incident light in a direction through the light guide, the light travelling between the first light signaling component and the second light signaling component.

11. The electronic device according to claim 10, wherein the reflecting element is arranged to reflect incident light primarily in one direction.

12. The electronic device according to claim 10, further comprising at least one of an optical conduit and the access channel, wherein each of the at least one of an optical conduit and the access channel is formed into one body part of the first and second body parts, wherein the first optical signaling component is arranged in the one body part to generate light that is coupled through one of the optical conduit and the access channel to the reflecting element.

13. The electronic device according to claim 12, wherein the first and second body parts are movable rotationally to each other, and wherein the light guide is one of a circular light guide and a disk shaped light guide, and wherein the reflecting element is disposed to reflect the light in a direction into the light guide through the access channel, and wherein the access channel is optically coupled tangentially to the light guide and optically coupled by the reflecting element to the optical conduit.

14. The electronic device according to claim 13, wherein a light signaling component is disposed in the second body part and optically coupled to the light guide by a reflecting element that extends into the light guide and has a non-reflecting back surface.

15. The electronic device according to claim 10, wherein the substantial portion is approximately the entire cross section of the one of the access channel, the first hollow channel, and the second hollow channel.

16. The electronic device according to claim 10, further comprising:
an access channel formed into the one of the first and second body parts near an end of a respective one of the first and second hollow channels; and
an optical signaling component disposed at an end of the access channel that is distal relative to the surface of the one of the first and second body parts to perform one of light transmission and reception of light that is coupled through the access channel to or from (respectively) the light guide.

17. An electronic device comprising:
a light guide formed by hollow channels, wherein each hollow channel comprises channel surfaces formed in a respective surface of a first and a second body part of the electronic device, and wherein the respective surfaces are generally adjacent to one another and the first and second body parts are movable relative to each other;
one of an access conduit and an access channel formed into one body part of the first and second body parts;
an optical signaling component disposed at a distal end of the one of the access conduit and the access channel, wherein the distal end is distal relative to the respective surface of the one body part; and
a reflecting element disposed near a proximal end of the one of access conduit and the access channel, wherein the proximal end is proximal relative to the respective surface of the one body part, and wherein the reflecting element extends into the hollow channel of the other body part, and wherein the reflecting element reflects light that is coupled between the optical signaling component and the light guide.

18. The electronic device according to claim 16, wherein the reflecting element reflects the light primarily in one direction.

19. The electronic device according to claim 17, wherein the one of the access conduit and access channel is approximately perpendicular to the respective surface of the one body parts.

20. The electronic device according to claim 17, wherein the first and second body parts are movable rotationally to each other, and wherein the light guide is one of a circular shaped light guide and a disk shaped light guide, and wherein the one of the access conduit and access channel is the optical conduit, and wherein the light reflected by the reflecting element is coupled between the light guide and the optical conduit by an access channel that is optically coupled tangentially to the light guide and optically coupled by the reflecting element to the optical conduit.

* * * * *